United States Patent [19]

Quisquater et al.

[11] Patent Number: 5,285,403
[45] Date of Patent: Feb. 8, 1994

[54] ARITHMETIC PROCESSING MODULE TO BE ASSOCIATED WITH A MICROPROCESSOR CENTRAL PROCESSING UNIT

[75] Inventors: Jean-Jacques Quisquater, Brussels, Belgium; Jean-Pierre Bournas, Chaville, France; Dominique De Waleffe, Brussels, Belgium

[73] Assignee: U.S. Philips Corporation, New York, N.Y.

[21] Appl. No.: 17,943

[22] Filed: Feb. 12, 1993

Related U.S. Application Data

[63] Continuation of Ser. No. 628,276, Dec. 14, 1990, abandoned.

[30] Foreign Application Priority Data

Dec. 29, 1989 [FR] France .................. 89 17456

[51] Int. Cl.$^5$ ........................ G06F 7/38
[52] U.S. Cl. ........................ 364/736
[58] Field of Search ................ 364/736, 754

[56] References Cited

U.S. PATENT DOCUMENTS

| | | | |
|---|---|---|---|
| 4,150,434 | 4/1979 | Shibayama et al. | 364/704 |
| 4,594,678 | 6/1986 | Uhlenhoff | 364/736 |
| 4,852,037 | 7/1989 | Aoki | 364/736 |
| 5,113,363 | 5/1992 | Orsine et al. | 364/736 |
| 5,163,154 | 11/1992 | Bournas et al. | 364/736 X |

FOREIGN PATENT DOCUMENTS

2613861 10/1988 France .

*Primary Examiner*—Tan V. Mai
*Attorney, Agent, or Firm*—David Schreiber

[57] ABSTRACT

A processing module for performing an operation of the type $B=a.X+T$ in which B, X and T are high value integers, and a is an operand having a format restricted to m bits, in sequences constituted from computing steps consisting in combining the operand a with operands $x_i$ and $t_i$, of restricted format, extracted from the data X and T, at the rank of significance i and in storing a partial result $b_i$ of the same significance rank, this processing module including a static multiplier and two adders and a resistor for storing and recycling the most significant portion of a previous computing step. The processing module includes k inputs for operands a (1 . . . k) of successive ranks, for successively applying, in work cycles k'steps the said operands a (1 . . . k) to one of the inputs of the multiplier, registers and multipliers enabling a delay of k computing steps in the most significant portion of the result at the output of a second adder and of (k−1) computing steps in the least significant portion of the same result, respectively in the first step and in the other steps of each cycle.

20 Claims, 5 Drawing Sheets

ARITHMETIC PROCESSING MODULE TO BE ASSOCIATED WITH A MICROPROCESSOR CENTRAL PROCESSING UNIT

This is a continuation of application Ser. No. 07/628,276 filed Dec. 14, 1990, now abandoned.

BACKGROUND OF THE INVENTION

The present invention relates to an arithmetic processing module associated with a microprocessor central processing unit, with a sequencer and with a working memory of the read-write type, for performing an operation corresponding to the general formula:

$$B = aX + T$$

in which B, X and T are high value integers and a is an operand having a format restricted to m bits, this operation being produced during a sequence of successive computing steps consisting in combining the operand a with operands $x_i$ and $t_i$ having a format restricted to n bits, which are respectively extracted from the integers X and T, at the rank of significance i taken in increasing order, and in storing the partial result $b_i$, of the same significance rank and also forming an extract having a format restricted to n bits of the complete result B, the processing module comprising inputs for the operands a, $x_i$ and $t_i$ and an output for the result $b_i$, a multiplier for performing the product $a.x_i$, followed by a first adder and a second adder, the second adder supplying a partial operation result which can be divided into a most significant portion and a least significant portion which is capable of being directed on output as a result $b_i$, the operand $t_i$ being applied to one of the inputs of one of the adders and the most significant portion of a preceding computing step being applied to one of the inputs of the other adder by means of a recycling storage unit.

The invention is more particularly but not exclusively aimed at small sized systems where the function of processing a digital information is executed by a single integrated circuit, of the microcontroller type. In such a circuit, a very strict compromise must be sought between the speed of execution of the processing and the implementation of a minimum number of components, in order to satisfy both the requirements of manufacturing cost and those of the duration of execution of the processing. A particularly significant example in this respect is represented by the miniaturized device of the "smart card" (or "chip card") type capable of multiple applications, for example: exchange of bank data, access control, signature authentication, etc.

When the data processing comprises a large number of similar arithmetic operations, it is advantageous to couple to a central processing unit (CPU), for which rather general management functions are reserved, a specialized processing module capable of performing a certain type of arithmetic and/or logic operation at high speed and of doing this in a relatively independent manner with respect to the central processing unit, at least while a sequence of consecutively concatenated operations is being performed.

A processing module of this type and complying with the definition given in the introductory paragraph is known from the patent application FR-A-2 613 861.

As this is a device principally intended to be incorporated in a microcontroller for a smart card it is necessary to try to economize as much as possible on the memory requirements to be integrated on the microcontroller chip and also to make best use of the clock speed which, according to current technologies, is rather limited. Finally, the sought objective is that the processing duration should be acceptable by the user, for example the waiting time for a processing result should remain, if possible, less than or in the order of one second.

An analysis of the known processing module shows that its operation must be frequently interrupted particularly for loading new data to be processed under the control of the central processing unit. These interruptions necessarily cause a very significant slowing down of the overall data processing operation.

SUMMARY OF THE INVENTION

The object of the invention is to supply an arithmetic processing module capable of being easily integrated into a microcontroller, which function with a minimum stoppage time and which also enables a reduction of the memory space to be used in conjunction with it.

In fact, according to the invention, a processing module according to the introductory paragraph is characterized in particular in that it comprises:

k inputs for k operands a [1 . . . k] of successive ranks successively applying, in cycles with k steps,
a [1 . . . k] to one of the inputs of the multiplier, An additional recycling storage units as well as an associated switching mechanism for delaying by (k−1) computing steps the least significant portion of the result of any computing step different from a first step in a cycle, and of delaying by k computing steps the most significant portion of the result of the first step of a cycle.

A processing module according to a particularly advantageous variant of the invention is characterized in that it comprises:

k inputs for operands a []
applying operands a [1 . . . p] to one of the inputs of the multiplier in succession and in cycles of p steps the number p of operands a [] being able, under the control of the central processing unit, to be chosen from among p = k and p<k (with p>2) for the duration of a sequence of operations, An additional recycling storage unit as well as associated switching circuits for delaying by (p−1) computing steps the least significant portion of the result of any computing step different from a first step of a cycle, and delaying by p computing steps the high significant portion of the result of the first step of a cycle, and means of delay selection capable of reducing by (k-p) the number of delay steps within the recycling storage units as a function of the value of p used.

It will be understood that, in comparison with the known processing module, the module according to the invention is more efficient since it operates, in a consecutive sequence of operations, k (or p) multiplication lines of a.X type instead of a single line.

The overall number of computing steps of course remains equivalent in order to obtain the same final result (i.e.: x multiplication lines) but on the other hand the number of interruptions corresponding to calls on the processing module by the central processing unit for the initiation of each sequence of operations is divided by k (or by p) with the processing module of the invention.

As will be seen in detail below, the invention enables the performance of an elementary multiplication operation, with its two associated additions, at each clock cycle, without any dead time during the entire running of a sequence of operations. At the same time, the address pointers corresponding to the data to be processed during the sequence which will follow can be independently loaded by the central processing unit such that the interruption of the processing module between one sequence and another can be reduced to the minimum.

The method and apparatus for enabling this result to be obtained and which are associated with the interface between the processing module and the central processing unit are the subject of a French patent application lodged by the Applicant at the same time as the present application and entitled "Microcontroller for the rapid execution of a large number of operations which can be divided into sequences of operations of the same kind".

Different practical embodiments of the invention are characterized by the choice of the number k of inputs for the operands a []; either k=3 which results in an optimum use of the bus connecting the processing module to the working memory, this bus being used in each of the steps of a three-step cycle, or k=4, with a cycle of four steps during which, for one cycle time, the said bus is not used.

An arrangement which is particularly suited to certain applications consists in providing a number k of inputs for the operands a [] equal to 4, as well as means of selection of inputs a [] able, under the control of the central processing unit, to operate during a sequence, either on 4 operands a [], or on 3 operands only, one of the inputs, the input a [4] for example, not being used. A great flexibility in the use of the processing module is then obtained depending on the specific operations to be performed at a given moment of the processing, for example a multiplication operation of the type $B=a.X+T$, performed in 3-step cycles with the operands a [1,2,3], followed by a modulo N reduction of the form: $R= -q.N+T$, performed in four-step cycles, and in which q is an integer quotient of the operation B/N, and T is the cumulative remainder of the previous operations.

According to an advantageous embodiment of the invention, the processing module, in which the the recycling storage unit is constituted by a first buffer register receiving on input the most significant portion of the result at the output of the second adder, is characterized in that the said additional recycling storage unit comprises a stack of (k−1) buffer registers in which the stored data are transferred step by step, in that the switching mechanism associated with the recycling comprise a first multiplexer and a second multiplexer, and in that the first buffer register is connected on output, on the one hand to a first input of the first multiplexer which has a second input connected to the operand input $t_1$, and an output connected to an input of one of the adders, and on the other hand to a first input of the second multiplexer which has a second input connected to the least significant output of the second adder and an output connected to an input of the other adder, via the the stack of (k−1) buffer registers.

When the processing module is provided with k inputs a [] and is capable of functioning in reduced cycles of p steps (where p<k), the said means of delay selection advantageously comprise a multiplexer called a "short-circuit multiplexer", capable of avoiding (k-p) register(s) during the transfer of data in the stack of buffer registers.

With the invention, a particularly simple and compact device is obtained in which provision is made, under the control of the sequencer, for the first multiplexer to be set up to transmit on its output the operand input $t_i$, and the second multiplexer to be set up to transmit on its output the datum presented at the output of the first buffer register, and for this to occur at each first step of a cycle of operations, while the first and second multiplexers are set up to the inverse of the abovementioned settings during the other steps of a cycle.

An even more extended use of the processing module according to the invention is obtained according to a variant embodiment characterized in that the said module furthermore comprises an "exclusive OR" circuit interposed at the output of the results $b_i$ in such a way as to transform the result $b_i$ into $b_i x$, x being either a constant with n bits loaded into a register associated with the said exclusive OR, or the operand $x_i$, depending on the setting of an additional multiplexer receiving the said values of x on its inputs and whose output is applied to the input of the exclusive OR circuit in conjunction with the result datum $b_i$.

Operations other than multiplication and addition can then be performed, for example searching for the opposite or for the 2's complement of any high value integer.

With regard to the necessary space in working memory, the processing module according to the invention enables the latter to be maintained at a minimum due to the fact that, by the set of recycling storage means, the data B and $T_i$ can be written at the same memory location since in general the result B of a sequence of operations becomes the data T (accumulator) for the next sequence.

BRIEF DESCRIPTION OF THE DRAWINGS

For a fuller understanding of the invention, reference is had to the following description fallen in connection with the accompanying drawings in which.

DETAILED DESCRIPTION OF THE PREFERRED EMBODIMENTS

Figure 1:
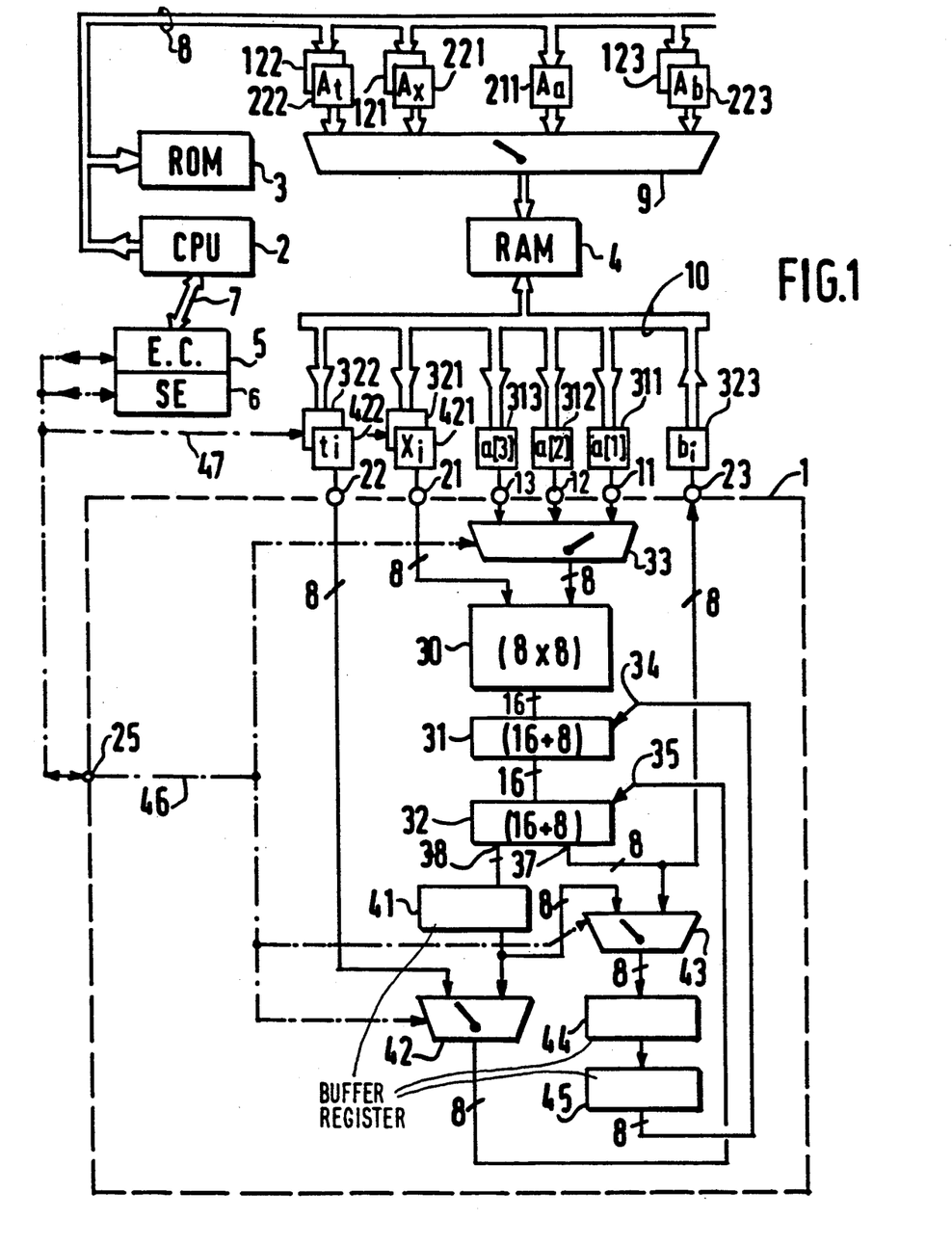
FIG. 1 is a block diagram of a processing module according to a first embodiment of the invention, also showing its principal connections with other sections together constituting an integrated microcontroller.

Reference is now made to FIG. 1 which is a diagrammatic representation of a first example of a processing module according to the invention. The processing module 1 is drawn inside a frame of dashed lines. It comprises three inputs 11, 12, 13 for operands a [1,2,3] as well as an input 21 for the operand $x_i$, an input 22 for an operand ti and finally an output 23 for the result $b_i$. The processing module 1 also comprises an input/output port 25 through which the sequencing controls for the processing module 1 pass, together with the status signals.

The processing module 1 is intended to be incorporated in a microcontroller which furthermore comprises a central processing unit 2 (CPU) a program memory 3 of the read-only type, and a working memory 4 of the read-write type. The functioning of the processing module 1 is managed from a "status and controls" registers unit 5 and a sequencer 6, these two modules being controlled from the central processing unit 2.

For reasons of clarity, only the connections essential for the functioning of the processing module 1 have been shown in the figure. Thus, with regard to the data transmitted or received by the central processing unit 2, it is usual to use a bus called an internal data bus of which only one element 7 has been shown in the figure, which relates to the link with the status and controls registers unit 5 and with the sequencer 6.

With regard to the addresses it is also customary to use a bus called an internal address bus 8 connecting, in particular, the central processing unit 2 with the program memory 3 and with the working memory 4. According to FIG. 1, it will be noted that the working memory 4 is not directly connected to the internal address bus 8 but through an address switching multiplexer 9 comprising on its inputs a set of address pointer registers comprising a double register 122–222 for the addresses of the operand $t_i$, a double register 121–221 for the address of the operand $x_i$, a single register 211 for the addresses of the operand a [1 ... k], (the number k of operands a [] being equal to 3 in this example), and a double register 123–223 for the addresses of the result $b_i$.

With regard to the data exchanged between the working memory 4 and the processing module 1, FIG. 1 also shows a particularly advantageous arrangement which uses a bus called a "local bus" 10 distributing the data to the data inputs 11, 12, 13, 21 and 22 and receiving the result data from the output 23. This connection to the local bus 10 is carried out via a set of data registers comprising the registers 311, 312, 313 for the data of the operands a [1], a [2] and a [3] respectively, a double register 321, 421 for the operand $x_i$, a double register 322, 422 for the operand $t_i$ and one or more register(s) 323 for the result datum $b_i$.

According to an arrangement not shown in FIG. 1 for reasons of clarity and because this arrangement does not directly relate to the actual operation of the processing module 1, the central processing unit 2 can also access the working memory 4 by means of a multiplexer (not shown) instead of and in place of the access by the processing module 1 by means of the local bus 10.

The double pointer registers 122–222, 121–221, 123–223, each have their leading register loaded by the central processing unit 2 with the start address in the working memory 4 where the data to be processed will be read or written for a sequence of operations. The image registers 222, 221, 223 of the same double registers are loaded under the control of the sequencer 6 from their corresponding leading registers and then automatically decremented under the control of the sequencer 6.

The double data registers 322–422 and 321–421 intended respectively for the operands $t_i$ and $x_i$, have their leading registers 322, 321 which are successively loaded during 2 steps of the clock cycle of the local bus 10 while in the next step the simultaneous transfer of data to the image registers 422, 421 is performed and in the same step the local bus 10 is used for writing into the working memory the result datum $b_i$ previously stored in the register 323. Thus, the local bus 10 is therefore occupied during the three steps of an operations cycle while the processing module 1 carries out three processing operations combining the operands $t_i$ and $x_i$, successively with the operands a [1], a [2] and a [3]. As will also be seen below, the processing module 1 comprises a recycling storage unit such that for the three operations steps forming a three-step cycle, a single result datum is to be written into the working memory 4.

In the example shown in FIG. 1, a format is chosen for the data entering and leaving the processing module 1 which is a uniform 8-bit format. It would of course also be possible to choose another restricted format, (for example 16 bits) for the data processing.

The processing module essentially comprises a static $8 \times 8$ bit multiplier 30 intended for producing the product a [] $x_i$, a first $16+8$ bit adder 31 and a second $16+8$ bit adder 32 and a recycling storage unit for enabling the introduction of the necessary delay of certain intermediate data in order to recycle them at the appropriate time and to obtain a single result datum for three operation steps.

The multiplier 30 receives on input on the one hand the operand $x_i$ coming from the data register 421 and on the other hand the data present at the output of the data selection multiplexer 33 which enables the successive application in a three-step cycle of the operands a [1], a [2], a [3] coming from the data registers 311, 312, 313. The multiplier 30 supplies on output, in a 16-bit format to an input of the first adder 31, while another input 34 of this adder receives data in an 8-bit format coming from a register 45. The output of the first adder 31, in a 16-bit format, is transmitted to an input of a second adder 32 which also receives on another input 35 a determined datum in an 8-bit format which for one of the steps of a three-step cycle corresponds to the operand $t_i$. The second adder 32 comprises two 8-bit outputs 37 and 38. The least significant bits of the result presented at the output 37 are taken to the output 23 and can be stored in the data register 323 as result data $b_i$. The output 38 relates to the 8 most significant bits of the result of the output of the second adder 32 and are taken to a buffer register 41 whose function is essentially to delay the result datum present in this register by one cycle step. The first buffer register 41 is connected on output on the one hand to a first input of a first multiplexer 42 of which receives as a second input the operand $t_i$ input 22 and whose output is connected to the input 35 of the second adder 32. The output of the first buffer register 41 is connected on the other hand to a first input of a second multiplexer 43 also which also includes a second input which is connected to the least significant output 37 of the second adder 32 output of this multiplexer being connected to the input 34 of the first adder 31 via a stack of two 8-bit buffer registers 44 and 45 in which the stored data are transferred step by step.

The stack of registers 44 and 45 constitutes what has previously been called the "additional recycling storage units", while the first multiplexer 42 and the second multiplexer 43 constitute the said "switching mechanism associated with the recycling".

The functioning of the processing module 1 during a cycle i, within a processing sequence, can be explained briefly as follows:

a) Cycle i—first step

Settings of the multiplexers:

multiplexer 33 with connection set to the input 11, multiplexer 42 set to the input 22, multiplexer 43 set to the output of the buffer register 41.

Result at the output of the second adder $32=x_i.a$ [1]+ present content of the register 45+operand $t_i$.

Least significant bits of the result $b_i$ stored in the register 323.

Transfer of data:

register 44 to register 45, register 41 to register 44.

Storage of the most significant bits of the result at the output 38 of the second adder 32 in the register 41.

Decrementation of the pointer register 222 (At) and loading of the operand $t_i+1$ in the register 322.

b) Cycle i—second step

Settings of the multiplexers:

multiplexer 33 set to the input 12, multiplexer 42 set to the output of the register 41 and, multiplexer 43 set to the least significant output 37 of the second adder 32.

Result at the output of the second adder 32: $=x_i.a$ [2]+ present content of the register 45+present content of the register 41.

Transfer of data: register 44 to register 45 o least significant bits of the result at the output 37 of the second adder 32 stored in the register 44 most significant bits of the result at the output 38 of the second adder 32 stored in the register 41.

Decrementation of the pointer register 221 ($A_x$) and loading of the operand $x_i+1$ in the register 321.

c) Cycle 1—third step.

Settings of multiplexers:

multiplexer 33 set to input 13, multiplexer 42 set to the output of the register 41, multiplexer 43 set to the least significant bits output 37 of the second adder 32.

Result of the operation =xi.a [3]+ present content of register 45+present content of the register 41.

Data transfer:

register 44 to register 45, least significant bits of the result at the output 37 of the second adder 32 stored in the register 44, most significant bits of the result at the output 38 of the second adder 32 stored in the register 41.

Decrementation of the pointer register 223 ($A_b$) and writing of the datum of the result $b_i$ in the working memory 4, from the register 323.

Simultaneous transfer of data from the operand registers, register 322 to register 422 ($t_i+1$), and register 321 to register 421 ($x_i+1$)

The processing module 1 is ready to carry out the first step of the next cycle i+1.

Throughout the sequence in progress, the operands a [1,2,3] are maintained fixed while the operands $t_i$ and $x_i$ vary in each three-step cycle. At the first step of cycle i+1 a new result datum will be stored in the register 323 while at the third step of this cycle, this result will be written into the working memory 4. It is necessary to state that the data transfers, for example within the stack of registers 44, 45, for the recycling of the data are operated synchronously.

The functioning of the processing module 1 such as described above shows that the least significant portion of the result at the output of the second adder 32 is delayed by two computing steps, for all computing steps other than a first step of a cycle by the set of registers 44 and 45, while the most significant portion of the result at the output of the second adder 32, during the first step of a cycle, is delayed by three computing steps by the additional delay effect contributed by its passage through the register 41.

In the envisaged application, the data T and X are high value integers (having 512 bits for example) such that a sequence of operations formed from successive three-step cycles can be carried out in a quasi-independent manner by the processing module 1. During this time, the central processing unit 2 has the necessary time for reloading the initial address pointers of the operands $t_1$ and $x_1$ and of the result $b_1$ for the purposes of the following sequence.

The operands a [1,2,3] will be loaded into the registers 311, 312, 313 during a particular three-step cycle performed at the start of each sequence, the pointer register 211 ($A_a$) being incremented by the sequencer 6 from its initial value loaded by the central processing unit 2.

At the end of a processing sequence, when the data of the operands $t_i$ and $x_i$ are used up, it will be necessary to "empty", from the processing module 1, data which are stored in it, particularly in the registers 41, 44 and 45. This is easily achieved using the same operating method and entering the zero value as an operand $t_i$ and $x_i$.

It is clear that these zero values can be stored in the working memory 4 after the data T and X. However the corresponding locations in the working memory 4 can advantageously be saved when data registers 321 and 322 are provided which can be forced to zero by the sequencer 6. From one operation sequence to the next, the groups of operands a [1,2,3] are advantageously taken in the order of decreasing significance of the datum A of which the said operands constitute extracts. For the start of the next sequence, the address pointer register 211 (Aa) will be correctly positioned and consequently the central processing unit does not have to intervene.

In general, the control links have not been shown in FIG. 1 for reasons of clarity in the figure. As an exception, and by way of example, a controls port 25 has been shown with a link symbolized by a dotted and dashed line going to the status and control registers unit 5 and to the sequencer 6 while within the processing module 1, these links have also been symbolized by dotted and dashed lines by a bus 46 effecting the controls of the multiplexers 33, 42, 43.

There has also been shown in a symbolic way a control link 47, external to the processing module 1, operating the data transfer in the data registers 321-421 and 322-422, as well as the previously mentioned forcing to 0 of the registers 321 and 322.

The sequencer 6, essentially constituted from a plurality of flip-flops timed at the clock frequency, does not require a detailed description because the sequencing conditions of the processing module 1 are derived by pure logic from the operating process described above.

The status and control registers unit 5 contains several registers in which are written the operating status information of the processing module 1 (off or running . . . ), the number of cycles to be performed in a sequence, and the number of steps during which the data registers 321 and 322 must be forced to zero at the end of a determined sequence. It suffices to mention that the status and control registers unit 5 comprises for this purpose a cycle counter and several registers in which are written the limits of the number of cycles to be performed under particular conditions (start of sequence and end of sequence). The status and control registers unit 5 can be constructed in any known manner. It can be arranged in such a way as to satisfy logic conditions which are simple to determine and which it is not necessary to describe in detail here.

Figure 2:
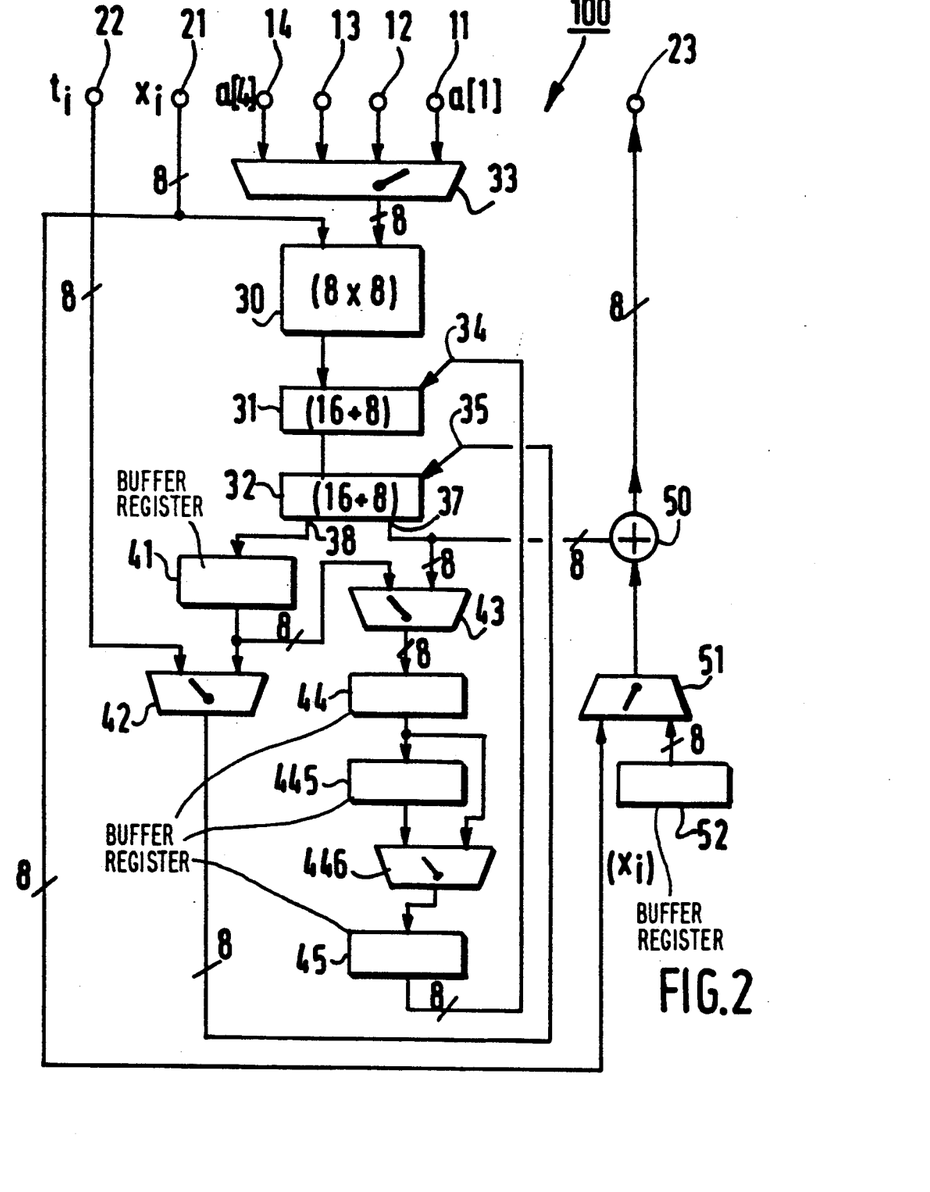
FIG. 2 shows, also in the form of a block diagram, a processing module similar to that of FIG. 1 but comprising several embodiment variants.

FIG. 2 shows a processing module 100, similar in its principle to the processing module 1 of FIG. 1, but in which there have been introduced several variant executions. The elements of FIG. 2 having the same functions as the elements of the processing module 1 in FIG. 1 have been given the same reference signs.

Firstly the number k of operand inputs a [] is here increased to 4 so that the number of data registers 311-313 of FIG. 1 is also increased by one register, connected to the processing module 100 at an input 14 for an operand a [4]. Similarly the data selection multiplexer 33 now comprises four selection settings to one of the inputs 11 to 14. The processing module 100 can be activated to function in four-step cycles performing, during an operations sequence, the equivalent of four simultaneous multiplication "lines". In order to obtain a recycling storage of the data which is appropriate in a four-step cycle, the stack of buffer registers now comprises three registers 44, 445, 45 (instead of two as in the case of the processing module 1 of FIG. 1). In a four-step cycle, the least significant portion of the result at the output 37 of the second adder 32 will therefore be delayed by three computing steps for all of the computing steps other than a first step of a cycle. The delay is increased to four steps with regard to the most significant portion of the result at the output 38 of the second adder 32 by the passage of this datum in the buffer register 41, this delay being introduced at each first step of a cycle.

If the processing module 100 can function in four-step cycles, using four operands a [1,2,3,4,], it can also function with a reduced number of operands, for example only three operands, the operations cycles being reduced to three steps as in the case of the processing module 1 of FIG. 1. In order to do this, it is sufficient for the status and control registers unit and the sequencer to have necessary means of controlling the data selection multiplexer 33 for the use either of four operands a [] or of only three operands, and to do this for the complete duration of an operations sequence. At the same time, when functioning with three-step cycles and a number of operands a [] reduced to three, it is necessary to reduce the stack of buffer registers 44-45 by one register in order to obtain the appropriate delay in the intermediate data recycling. This is performed by avoiding one of the registers in the stack of registers, the register 445 for example, by means of a "short-circuit" multiplexer 446. The processing module 100 is consequently very flexible in use depending on its applications and enables, in each sequence, the selection of the operating mode best suited to the processing to be performed. The use of 4 operands a [1 to 4] or of three operands a [1 to 3] only is simply obtained by an appropriate control of the data selection multiplexer 33 and a control of the setting of the multiplexer 446 avoiding or not avoiding the buffer register 445.

The processing module 100 of FIG. 2 comprises another variant with respect to that shown in FIG. 1, which consists in interposing an exclusive OR circuit 50 between the least significant output 37 of the results and the output terminal 23. The data results at the output 23 therefore result from the exclusive OR operation between the least significant output of the second adder 32 and a value chosen by means of an additional multiplexer 51 from among the operand $x_i$ or the content x of an 8-bit register 52 loaded by the central processing unit with a determined constant which can for example be the zero value or the hexadecimal value FF (i.e all bits at 1). This arrangement enables an increase in the processing capabilities of the processing module 100 as a function of the envisaged application requirements, for example when seeking the opposite value to a number of any length and possibly the 2's complement of the said number by adding 1 to the opposite of the number. In a practical embodiment, and as shown in FIG. 2, a processing module 100 can be produced which processes operand data all being in the 8-bit format. This is however not a necessity and it is equally possible to choose any other data format to be processed by the processing module 100. It would also be possible to increase the number k of operands a []. For this purpose it suffices to provide a multiplexer 33 having the required number of inputs, and increasing the number of registers in the stack 44-45 in order to increase it to (k−1) registers.

Figure 3:
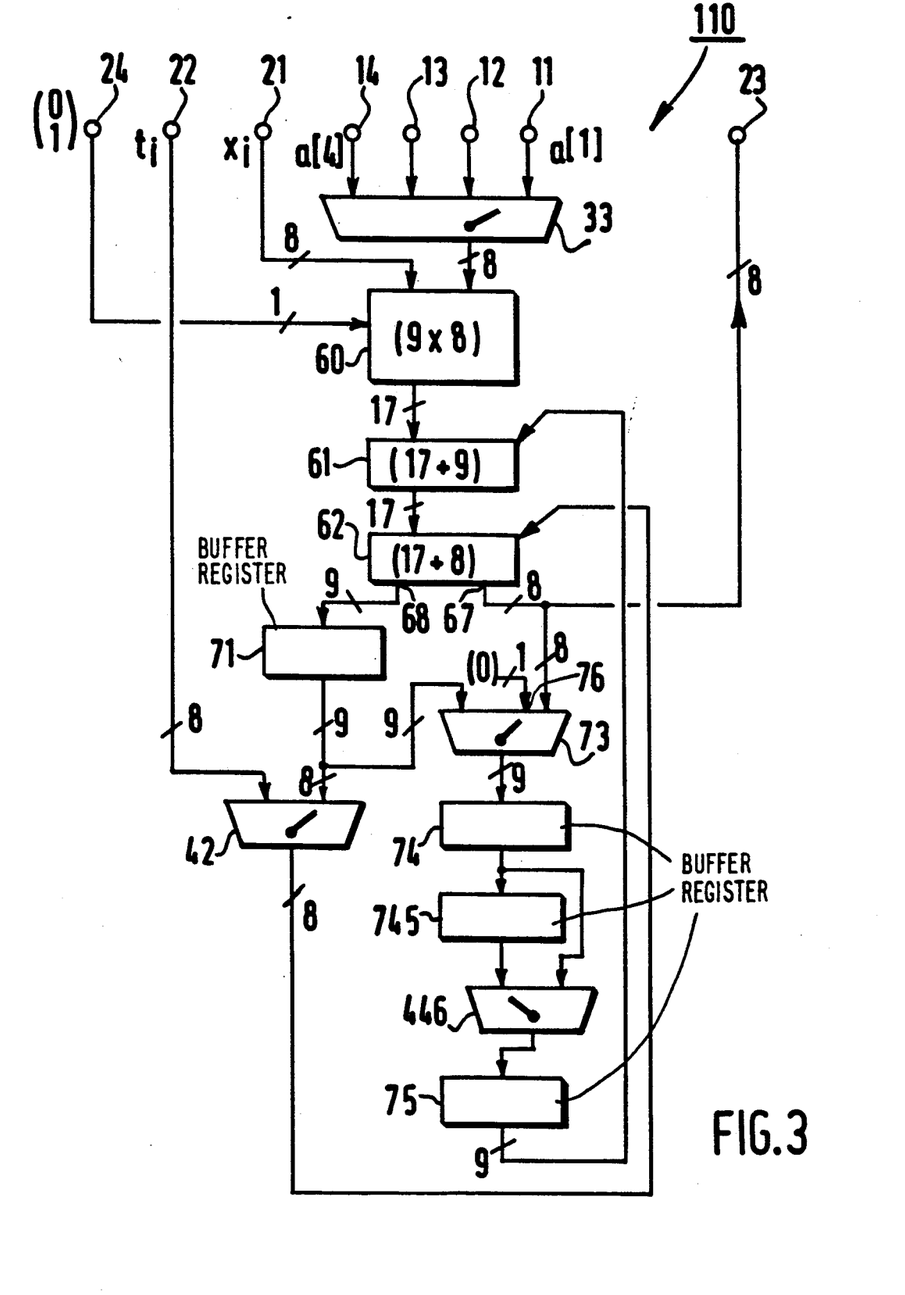
FIG. 3 shows a block diagram of a processing module in a second embodiment of the invention which simultaneously processes a possible overflow bit (of high significance) of the operand a [k]

FIG. 3 shows the diagram of another example of a processing module according to the invention. The processing module 110 of FIG. 3 relates to a particular application in which 1 most significant overflow bit is capable of appearing on the operand a [4] outside of the 8-bit format used. The taking into account of an overflow bit at 1 or 0 is carried out by the processing module 110 from an additional 1-bit input terminal 24. This overflow bit can be received for example in a status register in which it is stored as the result of a previous operation. The other operand inputs 22 ($t_i$), 21 ($x_i$), as well as the inputs 11 to 14 (a [1 . . . 4]) are similar to those of the processing module 100 in FIG. 2 having an 8-bit format. The same applies for the result output 23, also of 8 bits.

The single overflow bit is processed by the processing module 110 simultaneously with a processing operation by using a (9×8)-bit multiplier 60, having a 17-bit output, a first (17+9)-bit adder 61 and a second (17+8)-bit adder 62. Because the overflow bit has to be associated with the operand a [4], it is therefore in the fourth step of each cycle that this bit, when it is at 1, must intervene in the computation. A most significant output 68, of 9 bits, of the second adder 62 is therefore transmitted to the 9-bit buffer register 71, while in the first step of the next cycle the result stored in the register 71 is transferred into the stack of registers 74-75, these registers also being 9-bit registers. For the other steps of a cycle which relate to the operands a [1] to a [3] the overflow bit does not exist, the input 24 is at zero and in reality the processing is carried out over 8 bits such that the most significant output 68 of the second adder 62 in fact has its ninth bit at 0. Also, an input for a ninth bit of the first multiplexer 42 is not necessary and the multiplexer 42 is identical to its equivalent in FIG. 1 or 2.

With regard to the least significant results at the output 67 of the second adder 62, these results are always taken in an 8-bit format and when, outside of a first step of a cycle, these data are recycled in the stack of registers 74-75, a ninth bit at 0 is introduced into the stack of registers by means of an additional input 76 of the second multiplexer 73, this input being constantly forced to 0. As shown in the figure, it is also possible to require a reduction in the number of steps of a cycle from four to three, i.e. to use only the operands a [1,2,3], which is performed as indicated in the previous figure by a special control of the data selection multiplexer 33 and by a "short-circuit" multiplexer 446 enabling one of the registers of the stack of buffer registers 74-75 to be avoided, for example the register 745.

Finally, the processing module 110 of FIG. 3 functions in a way which is very comparable to that of the processing module 100 of FIG. 2. It enables during a sequence of operations composed of a four-step cycle the carrying out of operations on four operands a [1 to 4] simultaneously with a possible additional overflow bit of the operand a [4] without being obliged to make use of an additional sequence for processing this single bit.

Even though the processing module 110 of FIG. 3 has been described in an example in which the format of the operands is an 8-bit format, it is clear that any other value of restricted format could also be used. The embodiment of FIG. 3 more generally relates to a processing module 110 which, for the processing of n-bit operands, comprises a multiplier 60 arranged in such a way that it processes $(n+1) \times (n)$ bits, a first adder 61 operating on $(2n+1)+(n+1)$ bits, and a second adder 62 operating on $(2n+1)+n$ bits, in which the first buffer register 71, and the registers 74, 745 and 75 of the stack of registers are in the format of $(n+1)$ bits, and which furthermore comprises a second three-input multiplexer 73, a first $(n+1)$-bits input receiving the content of the first buffer register 71, a second n-bit input receiving the least significant output 67 of the second adder 62 and receiving, on an additional 1-bit input 76, forced to zero, an $(n+1)$th most significant bit to be recycled in the stack of registers 74, 745 and 75.

Figure 4:
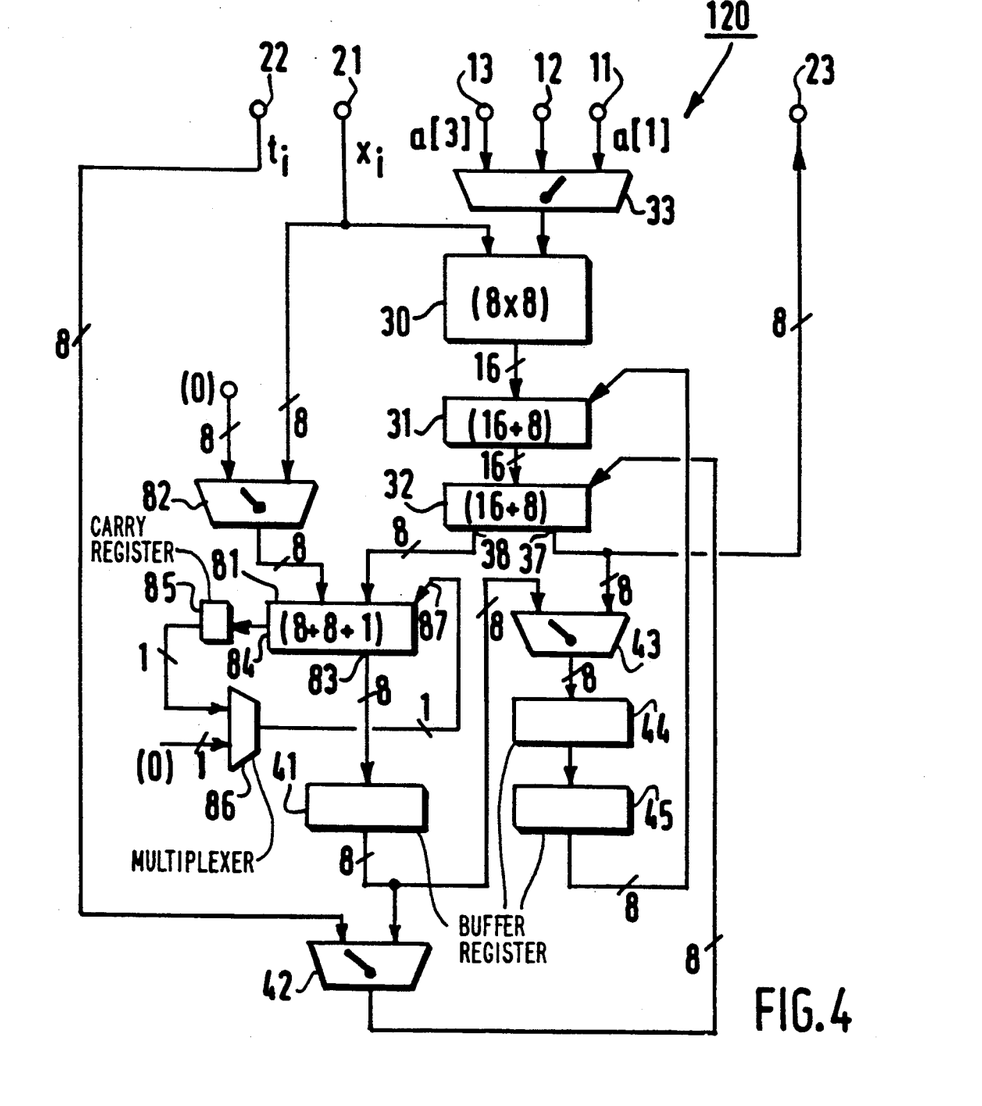
FIG. 4 is a diagram of a processing module according to a third embodiment of the invention, in which there is used, in particular, an additional adder.

FIG. 4 shows another embodiment of a processing module according to the invention. The processing module 120 can be considered as a variant embodiment of the processing module 1 in FIG. 1, of which it furthermore incorporates all of the elements represented with the same reference signs. It comprises 3 inputs 11, 12, 13 for the operands a [1 to 3] and consequently functions in sequences formed of three-step cycles. However, by means of several additional modules, with respect to the structure shown in the diagram of FIG. 1, the processing module 120 is also capable of simultaneously processing an additional overflow bit representing a most significant bit of rank just higher than the operand a [3].

The embodiment shown is based on the idea that, when the overflow bit is actually present, after having carried out the operation a [3] $.x_i$ the result is obtained when $x_i$ is added one more time with an appropriate shift of significance, i.e. a shift of 8 bits. This operation is essentially performed by means of a third adder 81, operating over $(8+8+1)$ bits, receiving on a first 8-bit input the most significant portion of the result at the output 38 of the second adder 32, receiving on a second 8-bit input either the value of the operand $x_i$, or the zero value over 8 bits, as selected by a third multiplexer 82. The third adder 81 comprises a first 8-bit output 83 connected to the input of the first buffer register 41, and a second 1-bit output, called the carry output, whose value is stored in a 1-bit carry register 85 for the purpose of recycling it with a delay of three steps to a third input 87, of the third adder 81 via a fourth multiplexer 86 called the "zero reset" multiplexer.

A possible overflow bit of the operand a [3], is stored by any appropriate means, for example in a register of the status and control registers unit 5 (FIG. 1). It is essentially to be taken into account at the third step of the cycle, at the same time as the performance of the operation: a [3]$.x_i$+ present content of the register 45+present content of the register 41 as has been explained with reference to FIG. 1.

In this case an additional addition of the operand $x_i$ with the most significant portion of the result at the output 38 of the second adder 32 is carried out. This is achieved by setting the third multiplexer 82 in such a way as to transmit the operand $x_i$ to its output.

This addition is capable of causing a carry which is stored in the register 85, while the 8 remaining bits are stored in the first buffer register 41 for the purpose of recycling them in the stack of registers 44-45 in the first step of the next cycle.

In all other cases, i.e. when the overflow bit is not at 1, or when the operations on the operands a [1] or a [2] (first or second steps of the cycle) are being performed, the third multiplexer 82 is set in such a way as to transmit the zero value which is equivalent to the third adder 81 having no more effect in the transmission of the most significant portion of the result to the first buffer register 41.

It should be noted however that the carry bit stored in the carry register 85 will be re-entered in the addition in the third adder 81 with a three-step delay, i.e. in fact in each third step of a cycle.

For the first and second step of each cycle, the zero reset multiplexer 86 is set in order to transmit to zero at its output.

The processing module 120 otherwise operates in a way which is very similar to that already described with respect to the processing module 1 of FIG. 1.

Figure 5:
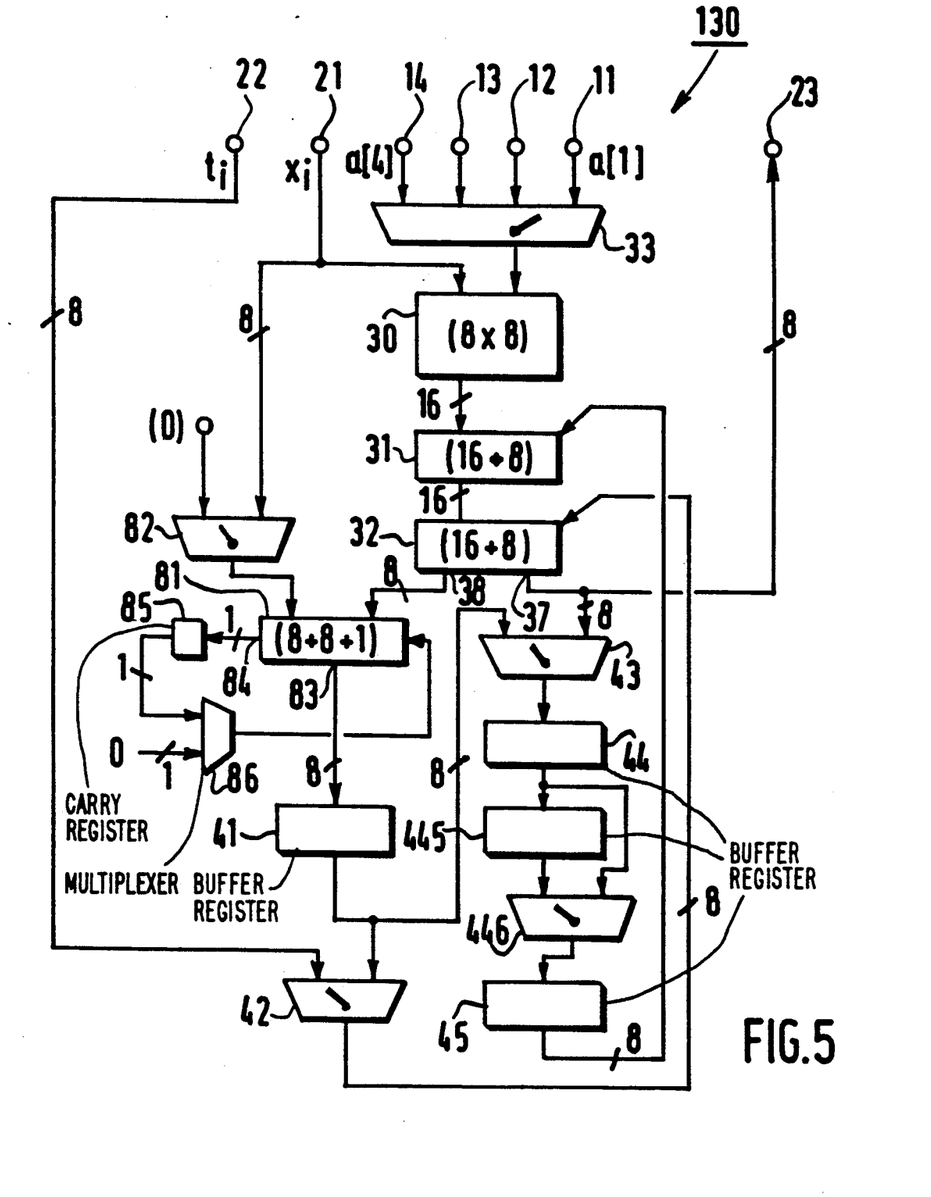
FIG. 5 shows the diagram of a processing module according to a fourth embodiment of the invention, which is related to that of FIG. 4 in that it concerns the use of an additional adder.

FIG. 5 shows another embodiment of a processing module 130 according to the invention. The processing module 130 shown is related to the processing module 120 in FIG. 4 in which the number of operand inputs a [] has been made equal to four. It is therefore constituted of the same elements as those incorporated in the processing module 120 of FIG. 4 with the exception of the data selection multiplexer 33 which is a four-input multiplexer and the stack of buffer registers 44-45 forming part of the recycling storage means which comprises, as in the case of FIG. 2, an additional register 445 in order to produce the appropriate delay in the intermediate data recycling. As with the processing module 100 described in FIG. 2, it was possible to reduce the number of operands a [] from four to three for certain determined sequences, so it is also possible to provide this capability in the processing module 130 of FIG. 5. It suffices to provide a short-circuit multiplexer 446 enabling the avoiding of one of the registers of the stack of registers 44-45 and thus re-establishing the appropriate recycling when the processing module must operate in three-step cycles. The functioning of the processing module 130 is otherwise easily derived from the description previously given with reference to FIGS. 2 and 4.

It must be understood that with reference to the previously given examples, other variant embodiments of the invention are still possible by substitution of means equivalent to those described. Furthermore, the complement consisting in adding, at the output, the combination of an exclusive OR with the result datum, such as described in FIG. 2, can be incorporated at will in any other described example. Although it is advantageous for the practical implementation of the invention to use, such as described in the examples, an 8-bit operand format, it is clear that any other format could equally well be used for the construction of a processing module according to the invention.

It should be noted that the processing module according to the invention can easily be integrated in association with a central processing unit of a microcontroller of known type, particularly with the 8051 microcontroller designed by the INTEL corporation, which it then uses without any modification of its standard instruction set. The status and control registers unit associated with the processing module of the invention is constituted by a section of the so-called "special functions" registers (SFR) provided in this microcontroller.

We claim:

1. An arithmetic processing module for use in a microprocessor for calculating in k cycles a product B of binary operands a, X, T, according to B=aX+T, based on an n-bit format, each of said binary operands a, X, T having a format of greater than n-bits, each bit of each of said binary operands having a significance level relative to every other of said bits, said operand a separated into k portions, each of said k portions having said n-bit format, said module comprising:

data transfer means for communicating said product and operands within said module according to said n-bit format;

storage means having k sections for storing said operand a, each section of said storage means having said n-bit format;

selection means coupled to said storage means for cyclically selecting one of said k portions of operand a during each of said k cycles, said selection means cyclically selecting said portion of operand a according to increasing significance levels;

multiplier means for receiving in each cycle said portion of operand a selected by said selection means and a portion of operand X having said n-bit format and having the same significance level as said portion of operand a and outputting a product of said portion of said operand X and said portion of operand a;

adder means for adding a portion of operand T and said output of said multiplier means and outputting as a first output and a second output portions of said product B, said first output having a higher significance level than said second output;

recycling means for retaining said first output for k cycles and for retaining said second output for k−1 cycles and then retrocoupling said first output and said second output to said adder means in place of said portion of said operand T.

2. The processing module of claim 1, wherein k is equal to 3.

3. The processing module of claim 1, wherein k is equal to 4.

4. The processing module of claim 1, wherein said recycling means includes a first buffer register for storing said first output of said adder means, a stack of k−1 further buffer registers for storing said second output of said adder means, a first multiplexer for outputting to said adder means one of said first buffer register and said portion of operand T and a second multiplexer for outputting to said stack of k−1 further buffer registers one of said first buffer register and said second output of said adder means.

5. The processing module of claim 4, wherein said operand a further includes an overflow bit connected to an additional input to said multiplier means, said first buffer register and said stack of stack of k−1 further buffer have a n+1 bit format, said adder means includes a first adder and a second adder, said first adder receives as inputs said output of said multiplier means having an 2n+1 format and an output of said k−1 stack of further buffer register having said n+1 bit format and has an output having said 2n+1 format, said second adder receives as inputs, said output of said first adder and said first buffer register, said second multiplexer receives as inputs, a portion of said first buffer register having an n-bit format, said second output of said adder means and an additional output equal to zero, said first multiplexer receives as inputs, said portion of operand T having said n bit format and said first buffer register having said n-bit format wherein said n+1th bit is ignored.

6. The processing module of claim 4 further including an overflow processing unit, said overflow processing unit including an overflow multiplexer having as inputs, said portion of operand X having said n-bit format and a value which equals zero having said n-bit format, an overflow adding means for adding said output of said adding means, an output of said overflow multiplexer, said overflow multiplexer having a first overflow output coupled to said first buffer register and a second overflow output having a 1 bit format, a carry register for storing said second overflow output and delay means for retaining said second overflow output for k cycles, said second overflow output input to said overflow adding means in a cycle immediately following said kth cycle.

7. The processing module of claim 4, wherein said first multiplexer outputs said portion of operand T during a first cycle and outputs said output of said first buffer register for each f said k−1 cycles and wherein said second multiplexer outputs said output of said first buffer register during said first cycle and outputs said second output of said adder means during each of said k−1 cycles.

8. The processing module of claim 1, wherein n equals 8.

9. The processing module of claim 1, further including an "exclusive OR" circuit having a first input connected to said second output of said adder means and a second input connected to one of said portion of operand X having said n-bit format and a predetermined constant.

10. An arithmetic processing module for use in a microprocessor for calculating in p cycles a product B of binary operands, a, X, T, according to B=aX+T, based on an n-bit format, each of said binary operands a, X, T having a format of greater than n-bits, each bit of each of said binary operands having a significance level relative to every other of said bits, said operand a separated into p portions, each of said p portions having said n-bit format, said module comprising:

data transfer means for communicating said product and operands within said module according to said n-bit format;

storage means having k sections for storing said p portions of said operand a, each section of said storage means having said n-bit format;

selection means coupled to said storage means for cyclically selecting one of said k portions of operand a during each of said p cycles, said selection means cyclically selecting said portion of operand a according to increasing significance levels;

multiplier means for receiving in each cycle said portion of operand a selected by said selection means and a portion of operand X having said n-bit format and having the same significance level as said portion of operand a and outputting a product of said portion of said operand X and said portion of operand a;

adder means for adding a portion of operand T and said output of said multiplier means and outputting as a first output and a second output portions of said product B, said first output having a higher significance level than said second output;

recycling means for retaining said first output for p cycles and for retaining said second output for p−1 cycles and then retrocoupling said first output and said second output to said adder means in place of said portion of said operand T.

11. The processing module of claim 10, wherein k is equal to 4 and wherein p is equal to 3.

12. The processing module of claim 11, wherein said recycling means includes a first buffer register for storing said first output of said adder means, a stack of k−1 further buffer registers for storing said second output of said adder means, a first multiplexer for outputting to said adder means one of said first buffer register and said portion of operand T and a second multiplexer for outputting to said stack of k−1 further buffer registers one of said first buffer register and said second output of said adder means.

13. The processing module of claim 12, wherein said recycling means includes a shortcircuit multiplexing means coupled between two of said k−1 further buffer registers for circumventing k-p of said k−1 further buffer registers.

14. The processing module of claim 10, wherein said recycling means includes a first buffer register for storing said first output of said adder means, a stack of k−1 further buffer registers for storing said second output of said adder means, a first multiplexer for outputting to said adder means one of said first buffer register and said portion of operand T and a second multiplexer for outputting to said stack of k−1 further buffer registers one of said first buffer register and said second output of said adder means.

15. The processing module of claim 14, wherein said recycling means includes a shortcircuit multiplexing means coupled between two of said k−1 further buffer registers for circumventing k-p of said k−1 further buffer registers.

16. The processing module of claim 14, wherein said operand a further includes an overflow bit connected to an additional input to said multiplier means, said first buffer register and said stack of stack of k−1 further buffer have a n+1 bit format, said adder means includes a first adder and a second adder, said first adder receives as inputs said output of said multiplier means having an 2n+1 format and an output of said k−1 stack of further buffer register having said n+1 bit format and has an output having said 2n+1 format, said second adder receives as inputs, said output of said first adder and said first buffer register, said second multiplexer receives as inputs, a portion of said first buffer register having an n-bit format, said second output of said adder means and an additional output equal to zero, said first multiplexer receives as inputs, said portion of operand T having said n bit format and said first buffer register having said n-bit format wherein said n+1th bit is ignored.

17. The processing module of claim 14 further including an overflow processing unit, said overflow processing unit including an overflow multiplexer having as inputs, said portion of operand X having said n-bit format and a value which equals zero having said n-bit format, an overflow adding means for adding said output of said adding means, an output of said overflow multiplexer, said overflow multiplexer having a first overflow output coupled to said first buffer register and a second overflow output having a 1 bit format, a carry register for storing said second overflow output and delay means for retaining said second overflow output for k cycles, said second overflow output input to said overflow adding means in a cycle immediately following said kth cycle.

18. The processing module of claim 14, wherein said first multiplexer outputs said portion of operand T during a first cycle and outputs said output of said first buffer register for each of said k−1 cycles and wherein said second multiplexer outputs said output of said first buffer register during said first cycle and outputs said second output of said adder means during each of said k−1 cycles.

19. The processing module of claim 10, wherein n equals 8.

20. The processing module of claim 10, further including an "exclusive OR" circuit having a first input connected to said second output of said adder means and a second input connected to one of said portion of operand X having said n-bit format and a predetermined constant.

* * * * *